United States Patent
Jaeckel et al.

(10) Patent No.: US 8,561,063 B2
(45) Date of Patent: *Oct. 15, 2013

(54) PLATFORM INDEPENDENT REPLICATION USING VIRTUAL MACHINES

(75) Inventors: Hansjoerg Jaeckel, Nussloch (DE); Matthias Sessler, Schwetzingen (DE)

(73) Assignee: SAP Aktiengesellschaft, Walldorf (DE)

( * ) Notice: Subject to any disclaimer, the term of this patent is extended or adjusted under 35 U.S.C. 154(b) by 189 days.

This patent is subject to a terminal disclaimer.

(21) Appl. No.: 12/731,599

(22) Filed: Mar. 25, 2010

(65) Prior Publication Data

US 2010/0180277 A1    Jul. 15, 2010

Related U.S. Application Data

(63) Continuation of application No. 11/116,824, filed on Apr. 28, 2005, now Pat. No. 7,725,893.

(51) Int. Cl.
G06F 9/46 (2006.01)
G06F 9/44 (2006.01)

(52) U.S. Cl.
USPC .................................. 718/1; 719/327

(58) Field of Classification Search
None
See application file for complete search history.

(56) References Cited

U.S. PATENT DOCUMENTS

| | | | |
|---|---|---|---|
| 6,490,695 B1* | 12/2002 | Zagorski et al. | 714/38.11 |
| 7,093,086 B1* | 8/2006 | van Rietschote | 711/161 |
| 7,178,151 B2* | 2/2007 | Ecob et al. | 719/327 |
| 7,356,679 B1 | 4/2008 | Le et al. | |
| 7,428,636 B1 | 9/2008 | Waldspurger et al. | |
| 2001/0049753 A1* | 12/2001 | Gary | 709/330 |
| 2002/0080938 A1 | 6/2002 | Alexander et al. | |
| 2003/0191911 A1 | 10/2003 | Kleinschnitz et al. | |
| 2004/0268347 A1 | 12/2004 | Knauerhase et al. | |
| 2005/0229175 A1 | 10/2005 | McCrory et al. | |
| 2008/0263072 A1* | 10/2008 | Koskas | 707/101 |

* cited by examiner

Primary Examiner — Camquy Truong
(74) Attorney, Agent, or Firm — Fish & Richardson P.C.

(57) ABSTRACT

Methods and apparatus, including computer program products, for platform independent replication. Methods can include capturing a virtualized software application residing on a virtual machine, capturing a guest operating system residing on the virtual machine, and storing the captured virtualized software application including the guest operating system as a virtualization image in a flat file on a physical computing device.

18 Claims, 2 Drawing Sheets

PLATFORM INDEPENDENT REPLICATION USING VIRTUAL MACHINES

CROSS-REFERENCE TO RELATED APPLICATIONS

This application is a continuation of U.S. application Ser. No. 11/116,824, filed on Apr. 28, 2005, the disclosure of which is expressly incorporated herein by reference in its entirety.

BACKGROUND OF THE INVENTION

The present invention relates to platform independent replication.

Today, modern, industry-standard computers can include multiple layers of hardware and software that operate together as a system. Hardware resources can include a central processor, display, storage, networking, peripheral devices, and so forth. Operating system components known as device drivers control hardware resources, translating operating system instructions into a specific device control language. Drivers are developed with an assumption of exclusive device ownership. For example, it is assumed that a video driver owns a video adapter exclusively. Any software application that calls the video adapter must interact with the hardware using the video driver. When assumptions about exclusive device ownership are broken, systems typically fail to function properly.

The concept of exclusive device ownership typically precludes the possibility of running more than one operating system concurrently on a computer. One approach to overcoming this limitation is virtual machine (VM) technology. Virtualization involves redirecting interactions with device resources at lower levels in such a way that higher-level application layers are unaffected (e.g., hardware resource sharing from an application level view).

SUMMARY OF THE INVENTION

The present invention provides methods and apparatus, including computer program products, for platform independent replication.

In general, in one aspect, the invention features a computer-implemented method including capturing a virtualized software application residing on a virtual machine, capturing a guest operating system residing on the virtual machine, and storing the captured virtualized software application and guest operating system as a virtualization image in a flat file on a physical computing device.

The invention can be implemented to include one or more of the following advantageous features. The method can include saving the flat file on a removable storage medium or in a removable storage device system format. The removable storage medium can be a compact disc (CD).

In embodiments, the method can include extracting the virtualization image from the flat file on the removable storage medium, and converting the extracted virtualization image to a physical image installed on a physical computing device. The virtualization image can also be executed directly as a virtual machine.

Converting can include changing relevant operating system and application settings inside the extracted virtualization image, and resolving hardware device driver dependencies. Resolving hardware device driver dependencies can include converting hardware-independent drivers to hardware-dependent drivers specific to a physical computing device.

The guest operating system can be Windows or Linux.

The invention can be implemented to realize one or more of the following advantages. Technology transfer often requires many identical training systems at an early product phase. At this early phase, there are typically many software/operating system/hardware dependencies, which can complicate the provision of training systems, test system landscapes, prototype sandbox systems and demo systems landscapes.

Methods of the present invention bundle software with an operating system, allowing the software to be executed on most any hardware platform in different locations worldwide. These methods combine a hardware abstraction layer with the bundling of application software and an operating system.

Methods of the present invention enable rapid provisioning of cloned systems based on a master replication script. These methods are hardware-independent. Bundling of application software with an operating system reduces the complexity of a system landscape by choosing and supporting one operating system for any kind of training, testing, sandbox and demo system landscape. The master replication script guarantees unique host names and system integrity in an wide-area network environment.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

FIG. 2 is a flow diagram.
Like reference numbers and designations in the various drawings indicate like . . . .

DETAILED DESCRIPTION

Figure 1:
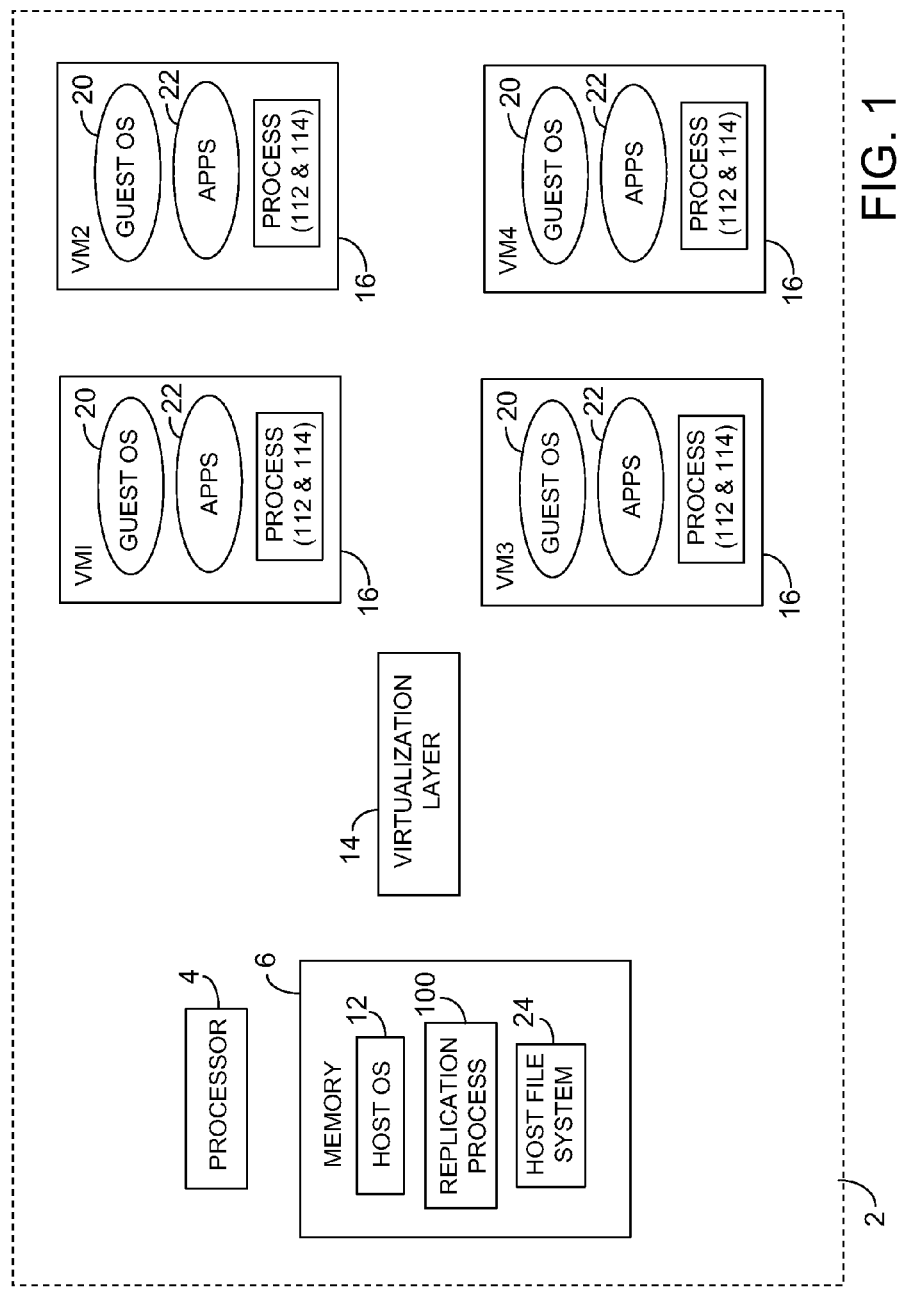
FIG. 1 is a block diagram.

As shown in FIG. 1, an exemplary virtual machine server architecture 2 includes a processor 4 and a memory 6. Memory 6 includes a host operating system 12, such as Linux or Windows, and a virtualization layer 14 that manages virtual machines 16 to enable the software infrastructure for hardware emulation. A virtual machine ("VM") mimics a hardware device in software for any system operation. Each virtual machine 16, which is referred to by a virtual hostname, includes a set of virtualized devices (not shown), such as a virtual "C:\" drive, and a part of a replication process described below. The virtual devices are the virtual hardware components for each virtual machine 16. A virtual device refers to a device that can be referenced but that does not physically exist. Virtual devices are managed by virtual (i.e., hardware-independent) drivers.

Each virtual machine 16 includes a guest operating system 20 and applications 22 running in the virtual machine 16, unaware, for example, that a network adapter in which they interact is only a software simulation of a physical Ethernet device. When a guest operating system 20 is executing, the virtualization layer 14 takes mediated control over the central processing unit (CPU) and hardware during virtual machine 16 operations, generating an isolated environment in which the guest operating system 20 and applications 22 run close to the hardware at the highest possible performance. Example virtual server architectures include VMware® from EMC Corporation and Virtual Server® from Microsoft Corporation.

The virtualization layer 14 is a multi-threaded application that runs as a system service, with each virtual machine 16 running in its own thread of execution; input/output (I/O) occurs in child threads. The virtualization layer 14 drives core functions from the host operating system 12. The underlying host operating system 12 kernel schedules CPU resources, and the device drivers of the host operating system 12 provide access to the real host system devices. The virtualization layer 14 provides the software infrastructure to generate virtual machines 16, manage instances, and interact with guest operating systems 20.

Virtual machine 16 isolation ensures that if one virtual machine 16 crashes or hangs, it does not impact any other virtual machine 16 or the host operating system 12. Maximum application compatibility is achieved through isolation, a benefit that enables users to take advantage of existing storage, network, and security infrastructures.

In a particular example, the virtualization layer 14 encapsulates virtual machines 16 in portable virtual hard disks (VHDs), enabling flexible configuration, versioning, and deployment. VHDs are used to assign storage (e.g., virtual "C:\" drive) to the virtual machine 16 and they contain data for a virtual machine 16 packaged as a single file on a host file system 24. The VHD appears to the guest operating system 20 and applications 22 as a single distributable storage volume.

The architecture 2 can be used aid developers when a new software product is released. Often with the release of the new software product, computer-implemented training software accompanies the product. Technology training often requires many identical training, sandbox, testing and demo systems at an early product phase, perhaps one for every student, developer, tester or sales representative. At this early stage there are usually many software/operating system/hardware dependencies, which complicate the provisioning of these kinds of systems.

To reduce this software/operating system/hardware complexity, software can be bundled on a storage medium from a virtual machine (such as a compact disc (CD)). More specifically, replication process 100 saves a virtualized software application residing on a virtual local drive, e.g., virtual "C:\" drive, of a virtual machine 16. The virtualized software application can include an application, a guest operating system residing on the same virtual drive of the virtual system, along with dependencies existing between the virtualized application and virtualized (e.g., guest) operating system, as a flat file on a physical server. In general, a flat file is a file containing records that have no structured inter-relationship. The flat file on the physical server can be copied to a removable storage medium (such as a CD). The removable storage medium then contains an image of the components that existed inside the virtual machine. This image is referred to by a virtual host name and includes hardware-independent device drivers (e.g., virtual device drivers).

In one particular example, this image can be transported and burned on to a new system, such as for example, on an unformatted server system. Once burned on to the new system, hardware-independent device drivers, e.g., virtual device drivers, are replaced by hardware-dependent device drivers compatible with the new system. The hostname of the image is changed using replication process 100, according to a naming convention defined by a user. The application can then be executed on the new system in a rapid and efficient manner.

In another particular example, the image can be executed with the virtualization layer 14 as a virtual machine 16.

The replication process 100 is independent of the virtualization layer 14 providing the software infrastructure to create virtual machines, manage instances, and interact with guest operating systems. As described above, virtualization involves redirecting interactions with device resources at lower levels in such a way that higher-level application layers are unaffected. The replication process 100 converts a virtualization image residing on a virtual machine to a virtual machine with a unique hostname setting.

The replication process 100 can also include the conversion from a virtual hard disk (VHD) to a physical image residing on a physical computing machine, e.g., server and capturing an image of a guest operating system residing in a virtual machine. Example virtual machines can be generated using VMware® or Virtual Server®.

Figure 2:
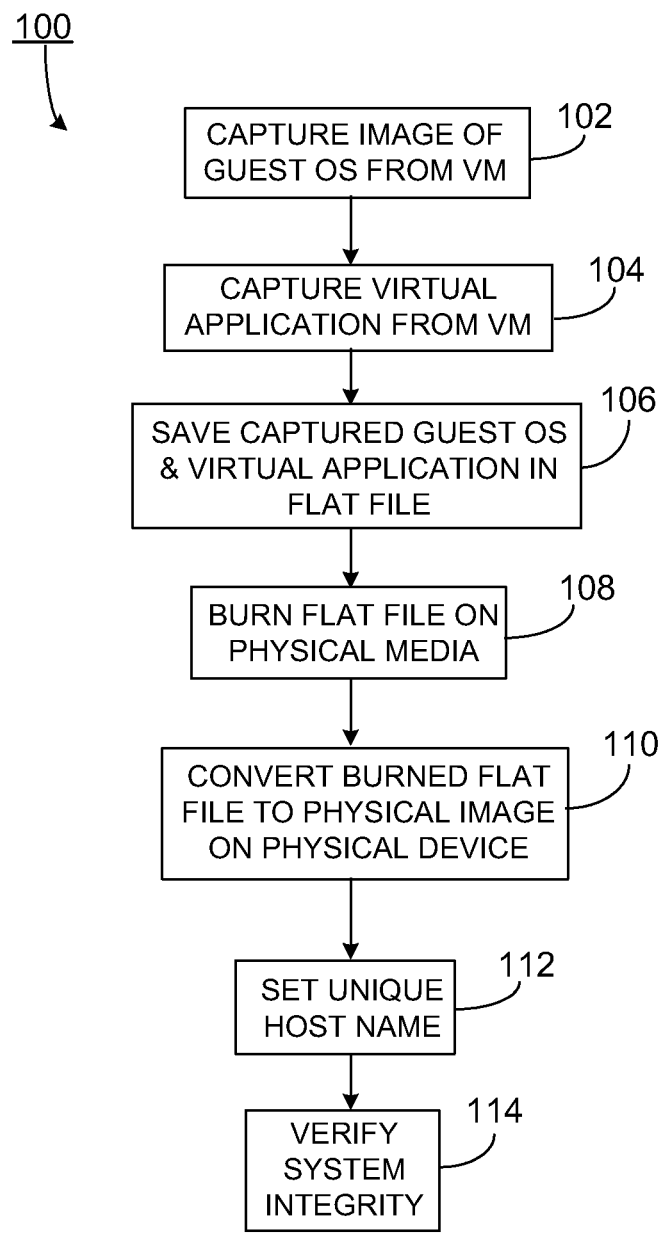

As shown in FIG. 2, process 100 captures a guest operating system (102) and captures (104) a virtual application residing in the virtual machine. The virtual application and guest operating system have virtual hardware dependencies that are satisfied by hardware-independent device drivers residing on the virtual machine.

Process 100 saves (106) the captured bundle of guest operating system and virtual application in a flat file on a physical server and burns/copies (108) the flat file on a storage medium such as, for example, a CD. The flat file now contains a virtualization image and can be referred to by a virtual host name derived from the virtual machine of origin.

When the CD with the virtualization image is placed in an unformatted physical computing device, such as a server, process 100 converts (110) the virtualization image residing on the CD to a physical image residing on the physical computing machine. Converting (110) includes renaming the host name and replacing the hardware-independent device drivers with hardware-dependent device drivers.

Process 100 sets (112) a unique host name and verifies (114) system integrity.

The invention can be implemented in digital electronic circuitry, or in computer hardware, firmware, software, or in combinations of them. The invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

The invention claimed is:

1. A computer-implemented method comprising:
   executing a plurality of virtual machines in a server architecture, each virtual machine including a virtualized software application and a guest operating system and being isolated from other virtual machines of the plurality of virtual machines;
   capturing the virtualized software application and the guest operating system residing on a virtual machine to provide a virtualization image, the virtualization image being referred to by a virtual host name derived from the virtual machine, providing an image of components that existed inside the virtual machine, and including hardware-independent device drivers;
   storing the virtualization image in a flat file on a physical medium; and
   replicating the virtual machine on a physical computing device by converting the virtualization image to a physical image on the physical computing device, the replicating comprising changing the virtual host name to a unique host name based on a user-defined naming convention and replacing the hardware-independent device drivers with hardware-dependent device drivers.

2. The computer-implemented method of claim 1, further comprising:
   extracting the virtualization image from the flat file on the physical medium; and
   converting the extracted virtualization image to the physical image installed on the physical computing device or using the virtualization image to run directly as a virtual machine.

3. The computer-implemented method of claim 2, wherein converting comprises:
   changing relevant operating system and application settings inside the extracted virtualization image; and
   resolving hardware device driver dependencies.

4. The computer-implemented method of claim 2, wherein the hardware-dependent device drivers are specific to the physical computing device.

5. The computer-implemented method of claim 1, further comprising
   extracting the virtualization image from the flat file on the physical medium; and
   executing the extracted virtualization image as a virtual machine.

6. The computer-implemented method of claim 1, wherein the virtualized software application and the virtualized guest operating system include virtual hardware dependencies.

7. The computer-implemented method of claim 1, wherein the server architecture comprises a virtualization layer that generates and manages each of the plurality of virtual machines.

8. The computer-implemented method of claim 1, wherein the virtualization image is referred to by a host name corresponding to a host name of the virtual machine of origin.

9. The computer-implemented method of claim 1, wherein the virtual machine is isolated from a host operating system of the server architecture.

10. The computer-implemented method of claim 1, wherein the guest operating system is Windows.

11. The computer-implemented method of claim 1, wherein the guest operating system is Linux.

12. A machine-readable storage device tangibly embodying a computer program product for platform independent replication, the computer program product being operable to cause data processing apparatus to:
    execute a plurality of virtual machines in a server architecture, each virtual machine including a virtualized software application and a guest operating system and being isolated from other virtual machines of the plurality of virtual machines;
    capture the virtualized software application and the guest operating system residing on a virtual machine to provide a virtualization image, the virtualization image being referred to by a virtual host name derived from the virtual machine, providing an image of components that existed inside the virtual machine, and including hardware-independent device drivers;
    store the virtualization image in a flat file on a physical medium; and
    replicate the virtual machine on a physical computing device by converting the virtualization image to a physical image on the physical computing device, replicating comprising changing the virtual host name to a unique host name based on a user-defined naming convention and replacing the hardware-independent device drivers with hardware-dependent device drivers.

13. The storage device of claim 12 further operable to cause data processing apparatus to:
    extract the virtualization image from the flat file on the physical medium; and
    convert the extracted virtualization image to the physical image installed on the physical computing device.

14. The storage device of claim 13 wherein converting comprises:
    changing relevant operating system and application settings inside the extracted virtualization image; and
    resolving hardware device driver dependencies.

15. The storage device of claim 12, wherein the hardware-dependent device drivers are specific to the physical computing device.

16. The storage device of claim 12, wherein the virtualized software application and the virtualized guest operating system include virtual hardware dependencies.

17. The storage device of claim 12, wherein the server architecture comprises a virtualization layer that generates and manages each of the plurality of virtual machines.

18. The storage device of claim 12, wherein the virtualization image is referred to by a host name corresponding to a host name of the virtual machine of origin.

* * * * *